United States Patent Office 2,979,351
Patented Apr. 11, 1961

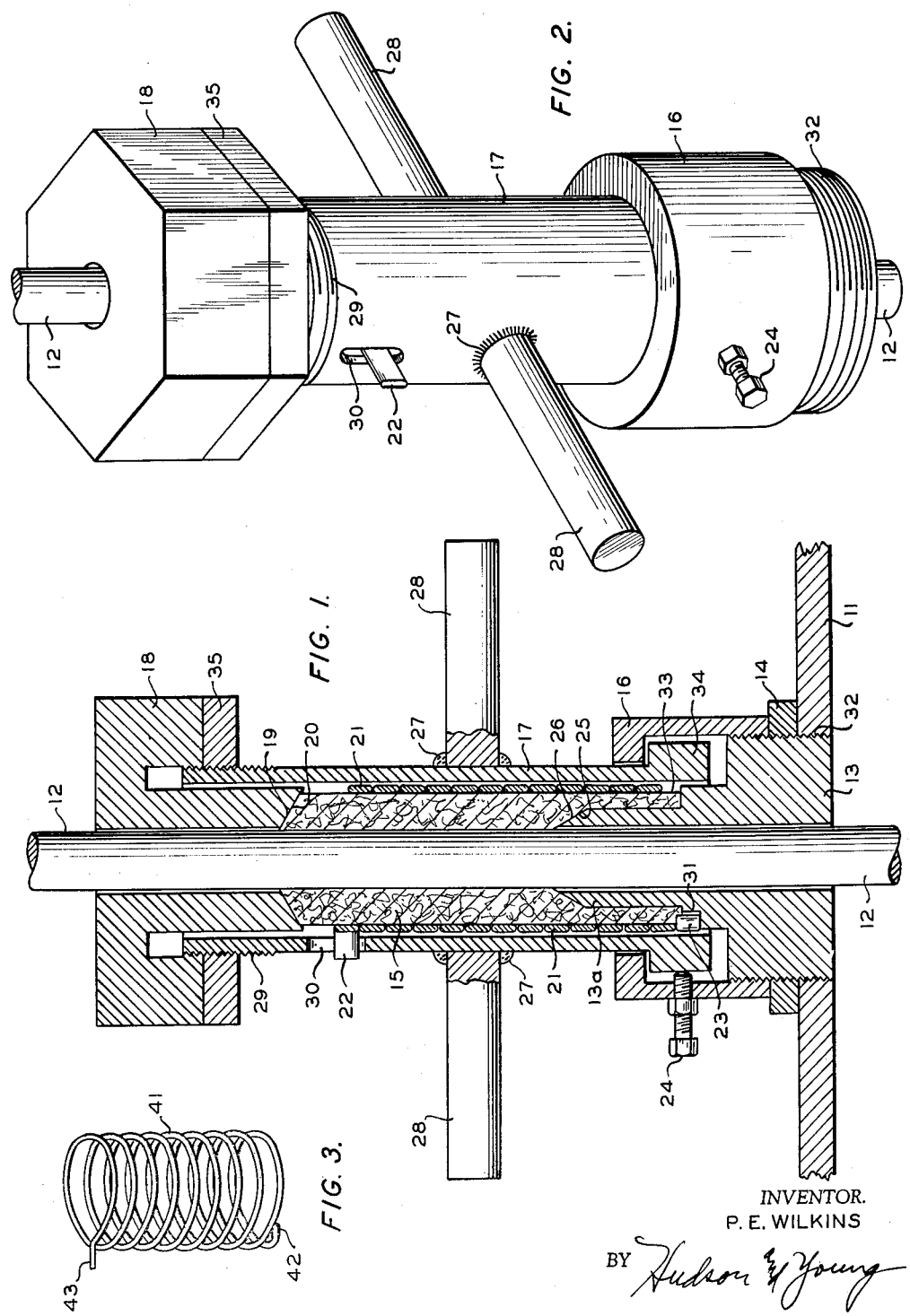

2,979,351

DISTRIBUTED PRESSURE PACKING GLAND

Paul E. Wilkins, Bartlesville, Okla., assignor to Phillips Petroleum Company, a corporation of Delaware Filed Aug. 30, 1957, Ser. No. 681,312

12 Claims. (Cl. 286—37)

This invention relates to a packing gland. In one aspect it relates to a packing gland which provides a positive seal between the movable and the fixed member to be sealed. In another aspect it relates to a packing gland which provides pressure equally distributed throughout the entire length of packing and radially toward the shaft to be packed.

An object of this invention is to provide a packing gland which provides a positive seal between the movable and fixed members.

Another object of this invention is to provide a packing gland which provides radial pressure over the entire length of the packing in the direction of the shaft to be packed.

Yet another object of my invention is to provide such a packing gland which is relatively simple and inexpensive to manufacture and to maintain.

Still another object of my invention is to provide such a packing gland which is suitable for use in packing rotating members as well as reciprocating members with respect to a fixed member.

Still other objects and advantages will be realized upon reading the following description which, taken with the attached drawing, forms a part of this specification.

In one known prior art packing gland a coil spring of small diameter is wrapped in V-shaped grooves between turns of packing around a shaft. In this case the only force tending to press the packing against the shaft is due to the tension of the spring. Also, much of the force of the spring is lost because of the effect Poisson's ratio in that successive windings of the spring tend to compress the packing longitudinally more than radially toward the shaft.

According to my invention the packing material is pressed directly against the shaft and throughout substantially its entire length.

Specifically, the packing gland of my invention comprises, in combination, a body member having first and second end portions, first means for attaching the first end portion to a support, an opening along the axis of said body member for accommodation of a shaft, an annular surface around said body member intermediate its end portions, said annular surface facing the end portion of said body member remote from said first means, a packing disposed around said body member and extending from said annular surface beyond the end portion of said body member remote from said first means, a helically wound metallic coil surrounding said packing and extending from the end of said packing adjacent said annular surface substantially to the other end of said packing, second means holding the end of said coil near said annular surface against rotation, a rotatable sleeve surrounding said coil, third means holding said rotatable sleeve against longitudinal movement from said body member, fourth means holding the other end of said coil nonrotatable with respect to said sleeve, a packing nut disposed operatively at the end of said packing remote from said body member, and fifth means for holding said sleeve nonrotatable with respect to said body member.

In the drawing Figure 1 illustrates diagrammatically, and partly in section, a longitudinal view of my apparatus.

Figure 2 is a perspective view of the exterior of my packing gland.

Figure 3 illustrates another embodiment of my invention.

Referring now to the drawing, and specifically to Figure 1, reference numeral 11 identifies a wall through which extends a shaft 12. A bushing 13 is threaded at 32 into wall 11. This bushing 13 is also termed herein the body member of the packing gland. The end of the body member opposite wall 11 terminates as a sleeve, that is, a thin walled tubular section 13a. As illustrated in the drawing, tubular section or sleeve 13a is constructed as an integral part of the body member 13. The outward end of the sleeve 13a is tapered at 26 as illustrated. Disposed around the sleeve 13a is a packing 15. This packing extends from an annular surface 33 throughout the length of the sleeve 13a and beyond its tapered end. Actually, the packing is continued on quite an appreciable distance beyond the tapered end 26. Reference numeral 19 identifies the end of the packing 15. Surrounding this packing is a helically wound metal band 21, as illustrated. The end of this metal band adjacent body member 13 is bent inwardly toward a shaft 12 and extends into a slot 31. Reference numeral 23 identifies the inward bent end of spring 21. Surrounding this coiled metal band is a sleeve 17, as illustrated. The end of sleeve 17 adjacent body member 13 is enlarged into the form of a flange 34. A flanged collar 16 is threaded to body member 13 and the flange mates with flange 34 to hold sleeve 17 against longitudinal movement away from body member 13.

The end of the metal band opposite the body member 13 is turned out at 22, as illustrated, and extends through a slot 30 in the sleeve 17. From this construction it is evident that upon rotation of sleeve 17 in the proper direction, the metal band tightens around the packing and presses it firmly against the shaft 12 and against the sleeve 13a.

The outer end of sleeve 17 is threaded to accommodate a packing nut 18, as illustrated.

It should be mentioned at this point that the packing nut 18 is provided for the purpose of applying longitudinal pressure to packing 15 and to prevent the packing 15 from longitudinal movement as the sleeve 17 is rotated to tighten the metal band 21. The adjoining or touching ends 19 of packing 15 and 20 of packing nut 18 are beveled as illustrated for the purpose of holding this end of the packing adjacent the shaft. The packing nut 18 is held by mating threads 29 to the sleeve 17.

A nut 14 is provided as illustrated as a surface against which the flange 16 is pressed when threading the flange 16 to the body member 13.

A set screw or set screw assembly 24 is provided as illustrated for preventing sleeve 17 from rotating in the direction to loosen the metal band 21 once it has been tightened. The above-mentioned nut 14 is a lock nut.

Handles 28 are welded at 27 to the exterior surface of the sleeve 17 for ease of rotation of the sleeve and for holding the sleeve after the metal band 21 has been tightened while adjusting the set screw assembly to hold the metal band in a tightened position.

Figure 2 illustrates the exterior view of this packing gland apparatus with shaft 12 extending from both ends thereof. Thus shaft 12 extends beyond the threaded section 32 of the body member 13, the set screw of assembly 24 extending through an opening in the flanged collar 16. The turned out end of the helically wound metal band 22 extends through slot 30 in the sleeve 17. Handles 28 are obviously apparent.

A lock nut 35 is provided for locking the packing nut 18 so that it will not become unthreaded in case of vibration.

The metal band 21 of my invention is so wound that it covers substantially the entire surface of the packing 15 so that all portions of the packing 15 are pressed tightly against the shaft 12. While I have illustrated 21 as being a helically wound metal band, this member is in some instances a coil of wire, closely wound, the wire being of circular, oval or of square or rectangular cross section, as desired. However, I prefer to use a metal band as illustrated and hereinabove described.

By applying pressure radially against the packing in the direction of the shaft, I do not depend upon the action of Poisson's ratio as the force is applied by a packing take-up nut, such as nut 18, for forcing the packing against the shaft. In this manner the sealing action of the packing is positive against the sleeve or tubular member 13 as well as against the shaft 12.

As mentioned hereinabove, the helically wound metal band of my invention applies pressure uniformly over all of the surface of the packing and this application of pressure is a marked advantage over the pressure ordinarily applied by packing take-up nuts. When conventional packing take-up nuts are tightened to increase the pressure of the packing, the ends of the packing are exposed to greater pressures than is the central portion of the packing. Thus the packing does not press uniformly against the shaft.

Furthermore, my invention makes certain that the packing is automatically centered around the shaft and there is no opportunity whatever for the packing to become separated from the shaft at any point.

The metal band of my invention can, if desired, be a coil spring but the use of a coiled spring is not essential. The metal band is, in some cases, merely a long metal band and when it is applied to the packing it is merely wrapped around the packing with the result that a helix is formed. Furthermore, tightening of the metal band against the packing or holding of the packing by the metal band does not depend on the strength of the helical coil but does depend upon rotation of sleeve 17 to tighten the coil against the packing. As the sleeve 17 is rotated to tighten the metal band coil, the diameter of the coil tends to decrease thereby making certain that pressure is applied to substantially the entire exterior surface of the packing. There is substantially no space whatever between the packing and the shaft at any point whatever for accumulation of liquid which might originate in a vessel into which shaft 12 extends. By strength of the helical coil is meant the compressive strength.

Any suitable type or form of packing is used, for example, ring packing, rope packing, or long sections of square or rectangular cross section packing is sometimes used. In these cases it is desirable to use prewound packing, such as a preformed helix.

The packing gland of my invention is used to pack the impeller shafts of centrifugal pumps. In such an application wall 11 represents the casing or volute of the centrifugal pump with the adjacent end of shaft 12 being the impeller end of the shaft. My packing gland also finds use in stirring apparatus such as in chemical industry in which materials are charged to a vessel and reaction progresses as the charged materials are stirred. In such a case this packing gland is, in some instances, attached to the top wall of the vessel with the impeller end of the shaft extending downward and into the vessel. It is in other cases attached to the side wall of the vessel or even to the bottom with the impeller shaft extending into the vessel.

It is seen that the packing gland of my invention has wide application and is useful in many more applications than herein mentioned.

Materials of construction of my apparatus may be selected from among those commercially available, taking into account corrosive nature of materials to be handled.

In Figure 3 is illustrated a wire coil 41 which is used, in some instances, in place of helical band 21. When the wire coil is used, one end 42 of the wire coil is turned in, as illustrated in the drawing, to fit into a slot or opening corresponding to slot 31 in body member 13, so that the coil cannot rotate around the body member. The other end 43 of the wire is turned out to fit into an opening corresponding to slot 30 in sleeve 17 so that the sleeve, when properly rotated, will tighten the wire coil around the packing.

While certain embodiments of my invention have been described for illustrative purposes, the invention obviously is not limited thereto.

I claim:

1. A packing gland comprising, in combination, a body member having first and second end portions, first means for attaching the first end portion to a support, an opening of uniform cross section along the axis of said body member for accommodation of a shaft, an annular surface around said body member intermediate its end portions, said annular surface facing the second end portion of said body member, said body member having a greater outside diameter from said first end portion to said annular surface than from said annular surface to said second end portion, a packing disposed around said body member and extending from said annular surface beyond the second end portion, a helically wound metallic coil surrounding said packing and extending from the end of said packing adjacent said annular surface substantially to the other end of said packing, second means holding the end of said coil near said annular surface against rotation, a rotatable sleeve surrounding said coil, said rotatable sleeve, said helically wound coil and said body member being positioned along a common axis, third means holding said rotatable sleeve against longitudinal movement from said body member, fourth means holding the other end of said coil nonrotatable with respect to said sleeve, a packing nut disposed operatively at the end of said packing remote from said body member, and fifth means for holding said sleeve nonrotatable with respect to said body member.

2. The apparatus of claim 1 wherein said second means comprises a slot in said body member, and the end of said coil adjacent said annular surface being shaped to fit into said slot.

3. The apparatus of claim 1 wherein said fourth means comprises a slot in said rotatable sleeve adjacent the end of said coil opposite said body member, and this last mentioned end of said coil being shaped to fit into said slot.

4. In the apparatus of claim 1, a handle attached to the outer surface of said rotatable sleeve to rotate same.

5. In the apparatus of claim 1 wherein said fifth means comprises a set screw assembly.

6. The apparatus of claim 1 wherein said coil is a helically wound metal band.

7. A packing gland comprising, in combination, a body member having first and second end portions, first means for attaching the first end portion to a support, an opening of uniform cross section along the axis of said body member for accommodation of a shaft, the second end portion of said body member being so tapered that the direction of taper forms an acute angle with said axis, the apex of said angle being adjacent said opening, an annular surface around said body member intermediate its end portions, said annular surface facing the tapered end portion of said body member, said body member having a greater outside diameter from said first end portion to said annular surface than from said annular surface to said tapered end portion, a packing disposed around said body member and extending from said annular surface beyond the tapered end portion of said body member remote from said first means, a helically wound metallic coil surrounding said packing and extending from the end of said packing adjacent said annular surface substantially to the other end of said packing, second means holding the end of said coil near said annular surface against rotation, a rotatable sleeve surrounding said coil, said rotatable sleeve, said helical wound metallic coil and said body member being positioned along a common axis, third means holding said rotatable sleeve against longitudinal movement from said body member, fourth means holding the other end of said coil nonrotatable with respect to said sleeve, a packing nut disposed operatively at the end of said packing remote from said body member, and fifth means for holding said sleeve nonrotatable with respect to said body member.

8. A packing gland comprising, in combination, a body member having first and second end portions, first means for attaching the first end portion to a support, an opening of uniform cross section along the axis of said body member for accommodation of a shaft, the second end portion of said body member being so tapered that the direction of taper forms an acute angle with said axis, the apex of said angle being adjacent said opening, an annular surface around said body member intermediate said end portions, said annular surface facing the tapered end portion of said body member, said body member having a greater outside diameter from said first end portion to said annular surface than from said annular surface to said tapered end portion, a packing disposed around said body member and extending from said annular surface beyond the tapered end portion of said body member remote from said first means, a helically wound metallic coil surrounding said packing and extending from the end of said packing adjacent said annular surface substantially to the other end of said packing, second means holding the end of said coil near said annular surface against rotation, a rotatable sleeve surrounding said coil, said rotatable sleeve, said helically wound metallic coil and said body member being positioned along a common axis, a flange extending outward from said rotatable sleeve adjacent the end thereof nearest said annular surface, a flanged collar mating with the flange of said rotatable sleeve and with said body member holding said rotatable sleeve against longitudinal movement of said body member, third means holding the other end of said coil nonrotatable with respect to said sleeve, a packing nut disposed operatively at the end of said packing remote from said body member, and fourth means for holding said sleeve nonrotatable with respect to said body member.

9. The apparatus of claim 8 wherein said second means comprises a slot in said body member, and the end of said coil adjacent said annular surface being shaped to fit into said slot.

10. The apparatus of claim 8 wherein said third means comprises a slot in said rotatable sleeve adjacent the end of said coil opposite said body member, and this last mentioned end of said coil being shaped to fit into said slot.

11. In the apparatus of claim 8, wherein said fourth means comprises a set screw assembly.

12. The apparatus of claim 8 wherein said coil is a helically wound metal band.

References Cited in the file of this patent

UNITED STATES PATENTS

| | | |
|---|---|---|
| 490,107 | Ferguson | Jan. 17, 1893 |
| 796,658 | Katzenstein | Aug. 8, 1905 |
| 975,313 | Badeker | Nov. 8, 1910 |
| 1,959,550 | Schnaier | May 22, 1934 |
| 2,245,007 | Nixon | June 10, 1941 |
| 2,340,016 | Pruiett | Jan. 25, 1944 |
| 2,486,962 | Meynig | Nov. 1, 1949 |

UNITED STATES PATENT OFFICE
CERTIFICATE OF CORRECTION

Patent No. 2,979,351  
April 11, 1961  
Paul E. Wilkins

It is hereby certified that error appears in the above numbered patent requiring correction and that the said Letters Patent should read as corrected below.

Column 5, line 7, for "helical" read -- helically --; column 6, line 8, for "of" read -- from --.

Signed and sealed this 13th day of February 1962.

(SEAL)

Attest:

ERNEST W. SWIDER  
Attesting Officer

DAVID L. LADD  
Commissioner of Patents